3,157,601
METHOD FOR THE PREPARATION OF METAL OXIDE SOLS WITH TWO OXIDE CONSTITUENTS
Frederick T. Fitch and Jean G. Smith, Baltimore, Md., assignors to W. R. Grace & Co., New York, N.Y., a corporation of Connecticut
No Drawing. Filed July 7, 1960, Ser. No. 41,241
5 Claims. (Cl. 252—301.1)

This invention relates to the preparation of stable sols containing dense, spherical particles composed of two oxide constituents, one oxide coating the other, by means of consecutive hydrolytic reactions using homogeneous hydrolytic agents, electrodialysis, or any other suitable process. In one particular embodiment the invention relates to a method of preparing stable thoria-urania sols containing dense, spherical particles by the hydrolysis of a reagent that releases ammonia in a solution of soluble salts of these metals to produce sols suitable for use as fuels in liquid homogeneous reactors.

Aqueous homogeneous reactors have several advantages over conventional type reactors used in nuclear power development. Briefly, these advantages reside in a higher power density than is available in a heterogeneous reactor, the ease with which fuel can be added to and fission products removed from the reactor system, and the wide size latitude an aqueous homogeneous reactor system allows, thereby making possible reactors which range in size from very small units to reactors large enough to be utilized in nuclear power plants.

It has been recognized that sols of urania, thoria, or thoria-urania can be used as fuels in aqueous homogeneous reactors. These types of sols have the advantage of being homogeneous particles of colloidal size and have been found to avoid the disadvantages that are present when thoria or urania slurries are used. There is, for example, no need to furnish agitation to prevent solids separation. These particles are not subject to attrition and because of the small particle size of the sols the problem of erosion of equipment is not significant.

These sols are stable at the extreme hydrothermal operating conditions of the reactor when the desired particle structure is obtained, that is, a dense, relatively spherical particle 40 to 400 m$\mu$ in diameter in sols that are substantially free of electrolytes. Such sols have viscosities almost the same as water. Higher viscosities are indicative of failure to accomplish these objectives.

By utilizing the process of our invention, it is possible to prepare mixed thoria-urania sols of suitable metal oxide content which are free from neutron-capturing components and are stable at the operation temperatures of aqueous homogeneous reactors. The sols thus formed exhibit the desirable characteristics previously described, that is, suitable density, good sphericity and little tendency to settle.

In cases where the sols are to be utilized as fuels for aqueous homogeneous reactors, the sols can be coated with silica or some other suitable material to improve their hydrothermal stability. Briefly, the process of coating comprises the addition of a layer of reactive silica to the sol particles followed by stabilization through addition of an alkali metal hydroxide and autoclaving at 150°. The silica and alkali metal have low neutron capture cross-sections and do not interfere with the nuclear reactions in the aqueous homogeneous reactor. In order to obtain the desired characteristics, the cladding step must be carried out in a carefully controlled manner and under carefully controlled conditions.

We have found that stable sols containing dense, spherical particles composed of two oxides wherein the oxide which hydrolyzes at the higher pH coats the oxide which hydrolyzes at the lower pH can be prepared in a simple and convenient process which comprises treatment of soluble salts of the metals with homogeneous hydrolytic chemical agents under closely regulated conditions. The recognition and application of these conditions is an essential feature of this invention.

Our process depends upon using salts which hydrolyze at a different pH thus, for example, uranium in the plus IV oxidation state hydrolyzes at a pH below 1. Thorium in the plus IV state, on the other hand, hydrolyzes at a pH of about 3, whereas uranium in the plus VI state hydrolyzes at a pH of about 5. In this system, uranium in the plus VI state could be used to coat thorium in the plus IV state. Thorium in the plus IV state would be suitable for coating uranium in the plus IV state because of the difference in their hydrolysis pH.

Examples are given which show the reaction being used in the thorium IV, uranium IV and uranium VI systems. However, our method will give satisfactory results when oxides of other easily hydrolyzed salts are used such as, for example, zirconium, titanium, aluminum, chromium, etc.

This hydrolysis has been accomplished by electrodialysis, and urea hydrolysis but any hydrolytic method of sol preparation should give satisfactory results. Thus the actinide metal oxide sols in addition to having utility as fuels in aqueous homogeneous reactors along with sols of alumina, zirconia, and titania have a broad potential as catalysts. Sols containing titania might be useful as paint pigments or paper fillers.

Urea is the preferred hydrolytic agent but other compounds capable of releasing ammonia slowly such as, for example, ammonium carbamate, potassium cyanate, hexamethylene tetramine, acetamide and formamide may be used. The processes of our invention are demonstrated employing urea as a homogeneous hydrolytic agent. The sol is purified in the later stages of the process. The process involves four steps as follows: (A) Hydrolysis; (B) decantation; (C) dispersion; (D) deionization.

The product sol recovered from this process has particles that are particularly dense, large and uniform in size and shape. These characteristics are generally superior to those obtained by physical methods. An important advantage of our process resides in its simplicity which provides an excellent opportunity to closely regulate the characteristics of the final product.

In the first step of the reaction using urea hydrolysis the hydrolysis is accomplished by controlled addition of urea in slight excess of the stoichiometric amount to a boiling solution of the salts of the metals. The reaction is carried out under reflux conditions, both for densification of the sol and for urea hydrolysis at the desired rate. Refluxing is continued until the deposition of the oxides is just complete. This point is characterized by a rapid pH rise. When the hydrolysis of the salt is complete as evidenced by the final sharp pH rise, the hydrolysis is terminated by cooling. When our sols are being prepared, they may flocculate before sol formation is complete. This flocculation is not particularly disadvantageous because the sol can be redispersed easily by allowing the particles to settle, decanting the supernatant liquid and redispersing in fresh deionized water. The final purification step is carried out by passing the sol through an ion exchange resin to remove electrolytes.

Each sol system usually has its own preferred preparation conditions which must be developed by experience. For example, the preferred process for the preparation of sols containing uranium in the plus IV state differs from the process used where the uranium is in the plus VI state. The method of addition of urea is different in these cases. Thus a satisfactory thoria-uranic oxide sol can be prepared by adding the urea in equal increments over the period of the run. The best thoria-uranous oxide sols were prepared by adding half of the urea initially and the balance over the period of the run.

Other factors become important where the uranium is in the plus IV state. Uranium in the plus IV state hydrolyzes at a pH below 1. This affects the mode of addition of the urea for hydrolysis of the oxide. A larger amount of the hydrolyzing agent can be added at an earlier stage of the reaction because of the initial high acidity of the uranium IV. We have found that interrupting the reaction by cooling to room temperature when thoria deposition is just beginning (~pH 3) is essential to proper cladding of uranous oxide sol particles with thorium oxides. An interruption near the end of the hydrolysis is important to particle sphericity and size uniformity only in the case of uranium VI containing sols. Particle formation in sols containing uranium IV does not depend on aggregation and cementation as in pure thoria sols or in thoria sols clad with oxides of uranium VI.

Control of the temperature during the hydrolysis reaction is very important. Reflux conditions must be maintained to insure proper sol formation. The slurry is stirred sufficiently only when the system is actually boiling. We have found that if the temperature were allowed to drop for any appreciable period of time, a material was produced which was redispersible only after refluxing with acid. If the temperature drop was prolonged, the thoria and urania tended to deposit on the walls of the reaction vessel.

Another of the variables that must be carefully controlled is the pH. In the process for the preparation of our thoria-uranic oxide, for example, the pH of the starting solution is preferably around 2. The end pH must be at least 4.5 to complete deposition of uranic oxide but less than 5 to avoid flocculation. However, the thoria-uranous oxide process is operated under more acid conditions. The uranous chloride solution is adjusted to a pH of about 0.1. Deposition of the uranous oxide sol starts at a pH of about 0.4 and ends at a pH of approximately 1.0. Thereafter, the pH rises rapidly to about 2.8 at which time thoria deposition commences. Hydrolysis is terminated as the pH begins its sharp rise above 3. To avoid irreversible flocculation, the pH should not be allowed to exceed about 5.

In the examples set out in our invention, the growth of the thoria-urania sol particles in the course of the sol formation was followed by an electron microscope. The thorium-uranic oxide sol formed in the manner of a thoria sol. Spherical particles of thoria averaging about 25 mμ were formed first. These later aggregated to form larger sol particles ranging from 40 to 400 mμ. Complete cementation of the smaller particles into larger units depended upon interrupting the hydrolysis when deposition of thoria was about ¾ completed. The uranic oxide deposited last as a thin layer at the surface of the thoria. Because the urania is a minor constituent with almost the same density as thoria, its presence cannot be detected through electron microscopy.

Sols containing 5% uranous oxide were formed by aggregation of 1–2 mμ thoria crystallites about a uranous oxide nucleus. The resulting sol particles were very regular spheres, ranging in size from 20–150 mμ. There was no secondary aggregation of these spheres to form still larger particles.

The 35% thoria, 65% uranous oxide sols developed first as pure uranous oxide sols. The uranous oxide particles were formed by aggregation of cubic subunits, which ultimately averaged 10 mμ in width, into larger cubic particles. These, in turn, became coated with 1–2 mμ thoria crystallites. The final particles still betrayed a cubic outline, but the surface texture was that of thoria. Final particle size ranged from about 10 mμ to 150 mμ.

With optimum control of the hydrolysis conditions, the size range of these particles may be relatively narrow. Uniform shape and size of the particles is a contributing factor in the hydrothermal stability of the product sol.

After hydrolysis of the urea is complete, the ammonium salts formed must be removed in order to obtain a sol of desirable stability since sols of this type tend to coagulate in the presence of electrolytes. Electrolyte impurities, either from the hydrolysis or as contaminants, must be reduced to a low level before appreciable stability under extreme hydrothermal conditions can be achieved. The bulk of the ammonium salts released during hydrolysis may be removed by the flocculation method in which the sols are flocculated by the salts released during hydrolysis or, if necessary, by the addition of a small amount of an ammonium salt. After flocculation, the solids are allowed to settle and the supernatant liquid is removed. The solids are redispersed in deionized water. Finally, the salts must be removed to the desired low level either by ion exchange methods or by centrifuge methods.

A convenient method for determining the concentration of residual electrolytes is by measurement of specific conductance. For sols of the present invention the final specific conductance will generally be in the range of $10^{-6}$ to $10^{-2}$ mho/cm. The stability of any given sol is improved by reduction in ionic content, therefore a specific conductance in the lower part of the range is preferred.

Specific conductance is measured at 25° C. and 1 kilocycle using a standard conductivity bridge with a cell inserted in one arm. The cell constant is determined using a KCl solution of 0.01 normality (the specific conductance of which is ascertained from conductivity tables) and using the equation:

$$K = L_{KCl} R$$

where $K$ = cell constant in cm.$^{-1}$.
$R$ = bridge resistance in ohms.
$L$ = conductance in mho/cm. of the standard KCl solution.

The specific conductance L of the sol in question can be determined by measuring its resistance in the same cell and using the equation:

$$L_{sol} = \frac{K}{R}$$

where $K$ = cell constant.
$R$ = resistance in ohms.

The sols may be concentrated as desired by any of the standard techniques such as evaporation or centrifugation and redispersion.

Electron micrographs were made using the standard techniques.

The present invention will be further explained by the following illustrative but non-limiting examples involving consecutive homogeneous hydrolysis. Similar results have been obtained by electrodialysis.

EXAMPLE I

A mixed thorium-uranyl nitrate solution was prepared by dissolving 298 g. of Th(NO$_3$)$_4$·H$_2$O and 13.4 g. of UO$_2$(NO$_3$)$_4$·6H$_2$O and 2500 g. of water (this composition contained 5% by weight U$_3$O$_8$) in a flask equipped with a thermometer, reflux condenser and a dropping funnel. The solution was heated to boiling immediately following its preparation. A total of 69.7 g. of urea was dissolved in 180 ml. of water and placed in a dropping funnel. The urea solution was added to the boiling thorium nitrate-uranyl nitrate solution in 36 hourly increments of 5 ml. each. The initial pH of the nitrate solution was 2.0 and rose to a pH of 3 within a few hours. This pH was maintained until the precipitation of thorium oxide was complete. The pH then began to rise and rose slowly to a pH of 4.6. Heating accompanied by good stirring was continued for 31 hours at which time the refluxing was discontinued by rapidly cooling the reaction vessel. The solution was flocculated in the course of preparation by the ammonium nitrate formed by hydrolysis of the urea. At the conclusion of the experiment the floc was allowed to settle, supernatant liquid was drawn off, and was replaced by deionized water.

Residual electrolytes were removed by a column packed with mixed ion exchange resin.

The final sol had the following properties:

pH=6.23
Spec. conductance=$5.2 \times 10^{-6}$ mho/cm.
Density=1.057
Percent total oxides (by density)=6.2
Percent $ThO_2$ (by X-ray)=6.0
Percent $UO_2$ (by X-ray)=0.20
Particle size range 25–165 m$\mu$ Electron micrographs of the product sol showed the particles to be generally spherical. The particles were apparently formed by association of 1–2 m$\mu$ units into 25 m$\mu$ spheres which in turn aggregated to form larger, generally spherical particles. The finished sol was separated into a solid and liquid phase by centrifuging at 10,000 r.p.m. The fluorescent X-ray analysis of both phases showed the urania to be associated entirely within the solid phase.

EXAMPLE II

A thorium oxide-uraneous oxide sol containing 95% thoria and 5% urania was prepared under a nitrogen atmosphere. A thorium chloride solution was prepared by mixing 243 g. of thorium hydrate (approximately 50% $ThO_2$) dissolved in 156 ml. of 12 molar hydrochloric acid and 238 ml. of water. This solution was mixed with a uranous chloride solution containing the equivalent of 6.25 g. of $UO_2$ obtained by electrolytic reduction of the uranyl chloride. The solution was adjusted to have a final weight of 2500 g. and a pH of 0.38 by adding excess water and HCl. A total of 79 g. of urea was weighed out. The charge was divided into two parts. Half of this amount (39.5 g.) was added just prior to the initial heat-up period to provide a strong driving force during the period of acid neutralization and initial hydrolysis. The other half was dissolved in sufficient deoxygenated water and made up to 200 ml. of solution. This solution was divided into 20 increments of 10 ml. each. The mixed chloride solution was heated to reflux temperature under nitrogen pressure.

The urea was added initially and at hourly intervals until all the urea was consumed. Refluxing was continued for 30 hours with three overnight interruptions. Refluxing was discontinued when the pH started to rise above pH 3. The solution was initially green in color. This color began to deepen shortly after refluxing was commenced and gradually turned to dark green opalescence. The opalescence gradually disappeared and slow settling black particles of uranous oxide became evident in the solution.

As the pH of the system continued to rise, the black particles began to disperse to a blue-black sol. Hydrolysis was interrupted after 12 hours at a pH of 1.8 as uranous oxide deposition was completed. This interruption was found essential to incorporation of thoria and urania into the same particle. After refluxing was resumed, the pH rose to approximately 3 at which time thorium oxide began to deposit, changing the color of the sol to a light gray. The completion of the thorium oxide deposition was indicated by a sharp rise in the pH. At this point the system was cooled to stop hydrolysis. The sol showed little tendency to settle so ammonium chloride was added until the sol flocculated. The sol was allowed to settle and the system decanted. The sol was redispersed in deionized water. Residual electrolytes were removed by passing the sol through a column with mixed ion exchange resin.

The product sol had the following properties: pH=4.87, spec. conductance=$1.1 \times 10^{-5}$ mho/cm., density=1.016, percent total oxides (by density)=2.4, percent $ThO_2$ (by X-ray)=2.3, percent $UO_2$ (by X-ray)=0.10, particle size range=25–65 m$\mu$, mean diameter=50 m$\mu$.

Samples for electron microscopy were withdrawn at intervals during the run and centrifuged at 10,000 r.p.m. to separate the hydrous oxides from contaminating electrolytes. The solids were washed, centrifuged again, and finally redispersed in deionized water.

Electron micrographs of these samples demonstrated that the sol particles were initially uranous oxide, formed through aggregation of cubic crystallites 1–2 m$\mu$ on edge into generally cubic particles averaging 35 m$\mu$. As the pH rose above 3, typical needle like thoria crystallites, 1–2 m$\mu$ in length, began to appear at the surface of the uranous oxide particles. Gradually the urania core became completely covered as thoria crystallites continued to form and deposit at the surface of existing particles. The final sol particles were quite spherical, resembling pure thoria sol particles of 50 m$\mu$ mean diameter.

EXAMPLE III

A thorium oxide-uranous oxide sol was prepared which contained 35% thoria and 65% urania using the following procedure. A charge of 140 g. of $ThCl_4 \cdot 8H_2O$ was added to a flask equipped with a thermometer, reflux condenser and a dropping funnel. This solution was mixed with 1323 ml. of $UCl_4$ solution containing the equivalent of 130 g. of $UO_2$. Water and hydrochloric acid were added to bring the total weight of the system to 4000 g. and the pH to 0.2. A total of 148.5 g. of urea was dissolved in sufficient deoxygenated water to make 300 ml. of solution. The system was heated to reflux temperature in an atmosphere of nitrogen and the urea was added in 20 increments of 15 ml. each. The first addition of urea to the solution was made as soon as the system reached reflux temperature. The balance was added at hourly intervals until all the urea had been consumed. The refluxing was continued for 49 hours with overnight interruptions after 12, 19, 27, 34, 43 and 47 hours. The progress of the hydrolysis was followed by removing samples and centrifuging to separate the phases. Analysis of the samples withdrawn indicated that uranous oxide deposition was complete within about 27 hours at a pH of approximately 1. After the precipitation of the uranous oxide was complete the pH rose rapidly to about 2.8 at which time thoria deposition started. The finished sol was almost black in color and settled on standing. The supernatant liquid was decanted and the solid phase was dispersed with deionized water and then deionized by passing through a column packed with a mixed resin. The final sol had the following properties:

pH=5.87
Spec. conductance=$1.35 \times 10^{-5}$ mho/cm.
Density=1.057
Percent total oxides (by density)=6.3
Oxide composition (gravimetric):
   Percent $ThO_2$=33.6
   Percent $UO_2$=66.4
Particle size range=25–75 m$\mu$
Mean particle diameter=45 m$\mu$ Electron micrographs showed the particles to be generally cubic in shape. The surface coating on the particles was typical of thoria. Interruption of hydrolysis at the proper time was found to be very important. These interruptions constituted cooling the sol to room temperature followed by reheating to reflux temperature. It was found to be essential that the hydrolysis be interrputed immediately following the rapid climb in pH to about 2.8 which marks the transition from deposition of uranous oxide to deposition of thoria. If this interruption was not made at the critical time, uranous oxide and thoria tended to deposit as separate particles.

EXAMPLE IV

A mixed thorium and uranous chloride solution was prepared to contain the equivalent of 52.5 g. $ThO_2$ and 97.5 g. $UO_2$. Total solution weight was 3000 g. The pH was adjusted to 0.12 with excess hydrochloric acid.

The amount of urea calculated as necessary to neutralize the system was 161 g. Half of this urea was added initially. The remainder was dissolved in deoxygenated water and added in 20 equal hourly increments of 10 ml. each. The solution was heated to boiling in a nitrogen atmosphere. The pH rose gradually as blue-black uranous oxide sol was formed. Hydrolysis was interrupted after 4.5, 12, and 19 hours. The latter interruption (at the end of 19 hours) was made at pH 0.81 well before the transition from urania to thoria deposition occurred.

The bulk of the electrolytes were removed by allowing the solid phase to settle, decanting the supernatant liquid, and redispersing in deionized water. The remaining traces of electrolyte were removed by passing the sol through an ion-exchange resin. Properties of the final sol were:

Conductivity = $2.4 \times 10^{-5}$ mho/cm.
pH = 5.48
Percent total oxides (by density) = 6.6

Electron microscopy showed the product to contain a separate uranous oxide phase and a separate thorium oxide phase. There was no coating of thorium oxide on a uranous oxide base. The uranous oxide particles ranged from 13–25 m$\mu$. The thorium oxide existed as 1–3 m$\mu$ crystallites randomly dispersed among the uranous oxide particles.

EXAMPLE V

A mixed thorium and uranous chloride solution was prepared to contain the equivalent of 130 g. $UO_2$ and 70 g. $ThO_2$. Total solution weight was 4000 g. The pH was adjusted to 0.18 with hydrochloric acid.

A total of 139 g. of urea, the amount necessary for neutralization plus a slight excess was weighed out. The urea was dissolved in oxygen-free water and added in 20 hourly increments of 15 ml. each. Hydrolysis was interrupted once (after 28 hours at pH 1.25) during the uranous oxide deposition phase and not again until thoria deposition was nearly complete (after 35 hours, when the pH had declined from around 3 to 2.39 prior to its final rise).

Electrolyte removal was effected as described in the preceding example. Final sol properties, prior to concentration, were:

Conductivity = $2.5 \times 10^{-4}$ mho/cm.
pH = ~5.5

Electron micrographs showed the product to contain separate uranous oxide and thorium oxide particles. The uranous oxide particles averaged about 13 m$\mu$ while the thorium oxide particles ranged between 30 and 45 m$\mu$.

It is obvious from a comparison of the data presented in Example III with the data presented in Examples IV and V that the hydrolysis must be interrupted just as the precipitation of thorium oxide is beginning. Failure to interrupt the hydrolysis at the critical time results in a mixture of the sol particles of uranous oxide and thorium oxide rather than a sol in which the thorium oxide coats the uranium. This interruption is a critical step in our process and must be included in any thorium oxide-uranous oxide sol preparation, although the exact positioning of this interruption becomes more critical as the uranium content of the mixed oxide system increases.

EXAMPLE VI

Although the unclad thoria-urania sol was stable at moderate temperatures, the hydrothermal properties of the sol were improved by cladding the sol with silica.

Briefly, the process comprises reacting the thoria-urania sol with a silica sol. A suitable silica sol containing 2% $SiO_2$ can be prepared by passing a sodium silicate solution through a column containing Dowex 50 cation exchange resin in the hydrogen form. In operation, a thoria-urania sol was heated to 40° C. with stirring. The silica sol was added rapidly with good mixing. The pH of the solution dropped as a result of the addition of the silica sol. The solution was then adjusted to a pH of 9 by the dropwise addition of 1 normal sodium hydroxide. The clad sol was refluxed overnight with stirring and after it had cooled it was passed through a mixed bed ion exchange resin and deionized. The pH of the clad sol was then brought up to 8.0 by the dropwise addition of 1 normal sodium hydroxide.

The silica cladding or coating can be seen by the electron microscope since there is a density difference between the thoria-urania and the silica. The electron micrograph of the clad thoria-urania sol showed that the particles were virtually 100% clad. The coating was smooth and did not show the particulate composition of the substructure of the clad. The thickness of the coating was about 70 to 150 angstroms. The silica-clad thoria-urania sol was heated at 300° for various periods of time in a glass pressure vessel to determine the hydrothermal stability of the sols. Results of these tests are given in Table I.

*Table I*

| Run | Sol | Hours | Temp., °C. | Atmosphere | Sol Fluidity |
|---|---|---|---|---|---|
| 1 | $ThO_2$–$UO_2$ | 65 | 300 | $O_2$ | Fluid. |
| 2 | $ThO_2$–$UO_2$ | 65 | 300 | $H_2$ | Fluid. |
| 3 | $ThO_2$–$UO_2$ | 300+ | 300 | $O_2$ | Fluid. |
| 4 | $ThO_2$–$UO_2$ | 300+ | 300 | $H_2$ | Fluid. |

Obviously many modifications and variations of the invention as hereinabove set forth may be made without departing from the essence and scope thereof and only such limitations should be applied as are indicated in the appended claims.

What is claimed is:

1. A process for the preparation of an aqueous sol of particles consisting of uranous oxide coated with thoria, which comprises the steps of preparing a solution of uranous chloride and thorium chloride, adding a quantity of urea at least equal to the amount stoichiometrically required to effect hydrolysis, heating the solution to about 100° C. for about 40 hours, interrupting the hydrolysis by cooling to room temperature at the point where the pH rises above 3 and deposition shifts from deposition of thoria to deposition of urania and continuing the hydrolysis until the pH rises to about 5, removing the electrolyte contaminants by decanting the supernatant liquid from the particles, redispersing the particles and passing the resulting sol through an ion exchange resin bed and recovering the product sol.

2. A process for the preparation of an aqueous sol of particles consisting of uranous oxide coated with thoria, which comprises the steps of preparing a solution of uranous chloride and thorium chloride, adding a quantity of urea at least equal to the amount stoichiometrically required to effect hydrolysis, heating the solution to about 100° C. for a period of about 40 hours with interruption of the heating by cooling to room temperature as the pH of the sol rises to about 3 and continuing the hydrolysis until the pH rises to about 5, removing the electrolyte contaminants by centrifuging the sol and redispersing the particles, passing the resulting sol through an ion exchange resin bed and recovering the product thoria-uranous oxide sol.

3. A process for preparing a sol of particles of thoria coated with uranic oxide in which the uranic oxide is present in an amount up to about 10% which comprises the steps of preparing an aqueous solution of thorium and uranyl sols, adjusting the pH of the solution to about 2, refluxing the solution while adding a hydrolytic agent capable of releasing ammonia selected from the group consisting of ammonium carbamate, potassium cyanate, hexamethylene tetramine, acetamide, formamide and urea, in a quantity at least equal to the stoichiometric amount required to effect hydrolysis and increase the pH to about 4.5 to 5, removing the electrolyte contaminants by centrifuging the sol and redispersing the particles, passing the redispersed sols through an ion exchange resin bed and recovering the product thoria-uranic oxide sol.

4. The process for preparing a sol of particles of uranous oxide coated with thoria which comprises the steps of preparing an aqueous solution of uranous chloride and thorium chloride, adjusting the pH to about 0.1, adding a quantity of a hydrolytic agent selected from the group consisting of ammonium carbamate, potassium cyanate, hexamethylene tetramine, acetamide, formamide and urea at least equal to the stoichiometric amount necessary to effect hydrolysis, cooling the system to room temperature as the pH rises to about 3.0, heating the system under reflux conditions until the pH of the system is about 5.0, removing the electrolyte contaminants by centrifuging the sol and redispersing the particles, passing the resulting sols through an ion exchange resin bed and recovering the product thoria-uranous oxide sol.

5. A process for preparing a sol of particles of uranous oxide coated with thoria which comprises preparing a solution of thorium chloride and uranous chloride, adjusting the pH to about 0.38, refluxing the solution while incrementally adding a quantity of urea at least equal to the stoichiometrical amount required to effect hydrolysis, cooling the system to room temperature as the pH rises above 3.0, continuing refluxing until the pH is about 5.0, removing the electrolyte contaminants by centrifuging the sols and redispersing the particles, passing the resulting sols through an ion exchange resin bed and recovering the product thoria-uranous oxide sols.

References Cited by the Examiner

UNITED STATES PATENTS

| | | | |
|---|---|---|---|
| 2,885,366 | 5/59 | Iler | 252—313 |
| 2,892,797 | 6/59 | Alexander et al. | 252—313 |

OTHER REFERENCES

Weiser: "Inorganic Colloid Chemistry," vol. II, pp. 104–120, 261, 262, 267–275, 321, 322 (1935).

Thomas et al.: "J.A.C.S.," vol. 57, pp. 1821–1825 (1935).

Dobry et al.: "J. de chimie physique," vol. 50, pp. 501–506 (1953).

AEC Document TID–11, 494, pp. 1–16, Final Report in January 1956–June 1958.

CARL D. QUARFORTH, *Primary Examiner.*

JULIUS GREENWALD, *Examiner.*